(12) United States Patent
Lupi (10) Patent No.: US 10,208,486 B2
(45) Date of Patent: Feb. 19, 2019

(54) VENTILATED WALL COMPRISING A REINFORCEMENT SYSTEM FOR PORCELAIN OR CERAMIC STONEWARE OR MARBLE OR TRAVERTINE OR CONCRETE COMPOSITES THIN PLATES

(71) Applicant: MARMOELETTROMECCANICA S.R.L., Rignano Flaminio (IT)

(72) Inventor: Quintilio Lupi, Rignano Flaminio (IT)

(73) Assignee: MARMOELETTROMECCANICA S.R.L., Rignano Flaminio (IT)

( * ) Notice: Subject to any disclaimer, the term of this patent is extended or adjusted under 35 U.S.C. 154(b) by 99 days.

(21) Appl. No.: 15/528,801

(22) PCT Filed: Feb. 10, 2014

(86) PCT No.: PCT/IB2014/000134
§ 371 (c)(1),
(2) Date: May 23, 2017

(87) PCT Pub. No.: WO2014/122523
PCT Pub. Date: Aug. 14, 2014

(65) Prior Publication Data
US 2017/0321428 A1    Nov. 9, 2017

(30) Foreign Application Priority Data
Feb. 8, 2013   (IT) .............................. RM2013A0068

(51) Int. Cl.
*E04F 13/08* (2006.01)
*E04F 13/14* (2006.01)
(Continued)

(52) U.S. Cl.
CPC ............ *E04F 13/0866* (2013.01); *B32B 7/12* (2013.01); *B32B 9/002* (2013.01); *B32B 9/047* (2013.01);
(Continued)

(58) Field of Classification Search
CPC .............. E04F 13/0866; E04F 13/0832; E04F 13/0875; E04F 13/144; E04F 13/142;
(Continued)

(56) References Cited

U.S. PATENT DOCUMENTS 4,920,716 A * 5/1990 Coffey .................... E04F 13/04
52/386

FOREIGN PATENT DOCUMENTS

DE         19501534 A1    7/1996
WO     2011036687 A1    3/2011

OTHER PUBLICATIONS

International Search Report for PCT/IB2014/000134 dated Jun. 30, 2014.

* cited by examiner

*Primary Examiner* — Patrick J Maestri
(74) *Attorney, Agent, or Firm* — Thomas Horstemeyer, LLP (57) ABSTRACT

The invention relates to a ventilated wall for buildings comprising a thin coating or first layer (1) comprised of porcelain or ceramic stoneware, of marble, of travertine or of volcanic stone or of cement compounds, suitable for being provided at a distance from said building to realize an interspace for air circulation, said ventilated wall comprising a reinforcement system (10) for said first layer (1) comprising, on the side faced toward said building, a second fiberglass layer (2), coupled with said first layer (1), a third layer (3) comprised of foamed material, and a fourth layer (4), the coupling of said layers (1, 2, 3, 4) being realized by gluing material having flexibility properties.

20 Claims, 6 Drawing Sheets (51) Int. Cl.
*B32B 7/12* (2006.01)
*B32B 9/00* (2006.01)
*B32B 9/04* (2006.01)

(52) U.S. Cl.
CPC ...... *E04F 13/0832* (2013.01); *E04F 13/0875* (2013.01); *E04F 13/142* (2013.01); *E04F 13/144* (2013.01); *B32B 2607/00* (2013.01)

(58) Field of Classification Search
CPC ........... B32B 7/12; B32B 9/047; B32B 9/002; B32B 2607/00
USPC ................................................ 52/309.3, 388
See application file for complete search history.

VENTILATED WALL COMPRISING A REINFORCEMENT SYSTEM FOR PORCELAIN OR CERAMIC STONEWARE OR MARBLE OR TRAVERTINE OR CONCRETE COMPOSITES THIN PLATES

CROSS-REFERENCE TO RELATED APPLICATION

This application is the 35 U.S.C. § 371 national stage application of PCT Application No. PCT/IB2014/000134, filed Feb. 10, 2014, where the PCT claims priority to and the benefit of, IT Patent Application No. RM2013A000068, filed Feb. 8, 2013, both of which are herein incorporated by reference in their entireties.

The present invention relates to a ventilated wall comprising a reinforcement system for porcelain or ceramic stoneware marble or travertine, plates having a thin thickness.

More specifically, the invention concerns a system of the above kind permitting conferring to thin plates (usually thickness ranging between 3 and 6/7 mm) high flexure and breaking resistance features as well as manageability necessary during assembling step.

Ventilated walls have been created by a continuous search and starting from the needing of providing an efficient thermal and acoustic insulation for rooms by structures and materials ensuring a high aesthetic quality.

Porcelain stoneware represents one of the best products for improving realization of ventilated walls permitting maintaining insulation and protection features with respect to weathering and noises.

As it is well known, porcelain stoneware has high wear resistance properties, maximum resistance to changes of temperature, chemical attacks, anti-scratch chromatic properties, hygienic surface and fire proof, and thus it is always more employed in contemporaneous architecture, always searching for innovative systems joining functionality, aesthetic and technical performances.

Figure 1:
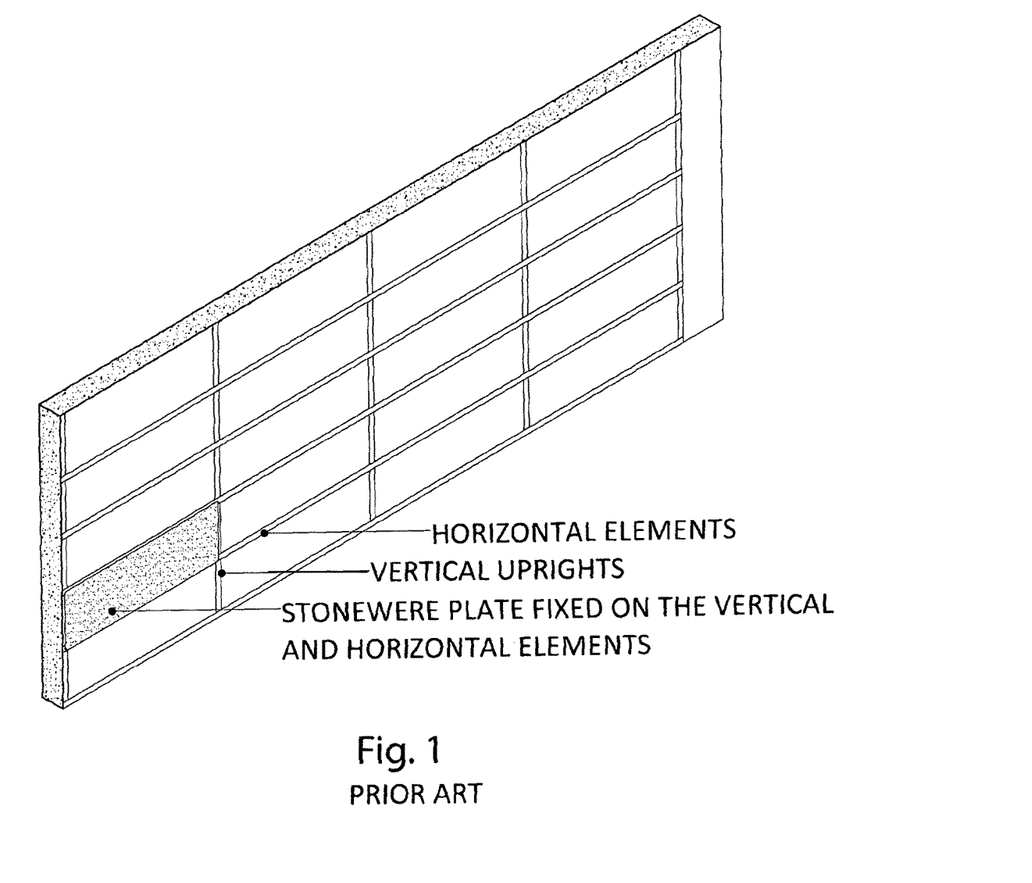
FIG. 1 is a perspective view of a ventilated wall comprising a reinforcement system comprising a porcelain or ceramic stoneware plate according to the known technique.

At present, to use porcelain or ceramic stoneware, of marble, of travertine or of volcanic stone thin plates to realize building ventilated walls, a system is provided comprised of aluminum vertical uprights anchored to the outer wall of the building by brackets, on which the plate outer face is fixed by horizontal aluminum elements. An example of the above solution is shown in FIG. 1.

In view of the extreme delicacy of the mounting, the above support and assembling technology does not ensure to the porcelain stoneware plate a suitable flexure and shock resistance, and thus a sufficient breaking strength.

Further, said support or frame, installed beforehand on the ventilated wall, must fulfill very strict planarity tolerances, which are difficult to be fulfilled since, during installation, operator must exert a push that could break the plate.

Recently, in order to improve the final result, solutions have been suggested, e.g. providing coupling between porcelain stoneware plates having the same thickness. Said solution, even not improving the flexure and shock strength of the final product, is more expensive, further not permitting an easy workability, thus limiting the application fields.

Further, the problem still remains deriving from the risk of failure of the porcelain, stoneware plates, particularly under strong wind conditions hitting from behind the empty parts of the ventilated wall.

In view of the above, it is suggested the solution according to the present invention, aiming at overcoming the abovementioned problems, providing support system permitting optimizing shock strength not only while working and transporting porcelain or ceramic stoneware plates, but also when installing the same, thus easing their use as inner or outer coatings, but mainly for large building ventilated walls, requiring such a flexion to accommodate possible, but unavoidable, differences of vertical elements of outer walls.

Another object of the present invention is that of providing a support system permitting exalting porcelain stoneware plate features, supporting the same with other materials ensuring reinforcement against accidental shocks and any other stress.

It is therefore specific object of the present invention a ventilated wall for buildings comprising a thin coating or first layer comprised of porcelain or ceramic stoneware, of marble, of travertine or of volcanic stone or of cement compounds, suitable for being provided at a distance from said building to realize an interspace for air circulation, said ventilated wall comprising a reinforcement system for said first layer comprising, on the side faced toward said building, a second fiberglass layer, coupled with said first layer, a third layer comprised of foamed material, and a fourth layer, the coupling of said layers being realized by gluing material having flexibility properties.

Preferably, according to the invention, said gluing material can have the following mechanical features: 75-85 Shore D1/D15 hardness (ISO 868: 2003), preferably 80 Shore D1/D15 hardness (ISO 868: 2003); tensile strength 19-21 MPa, preferably 20 MPa (ISO 527: 1993), elongation at break 28-32%, preferably 30% (ISO 527:1993).

Particularly according to the invention, said material can be a resin.

More particularly, according to the invention, said resin can be an epoxy resin or a polyurethane resin.

Still according to the invention, said resin can be obtained by a mixture of polymeric precursors with elastomeric agents having a concentration between 7 and 15% in weight of the total weight of the mixture.

Always according to the invention, said resin can be obtained from a mixture or polymeric precursors with thixotropic agents.

Further according to the invention, said resin can be obtained from polymeric precursors with poli-sulfuric polymers in a weight percentage between 30% and 45%.

Further, according to the invention, said resin can be obtained by a polymeric precursor mixture having a viscosity of about 3 mPas at 25° C. according to BROOKFIELD LVT.

Still according to the invention, said third layer can be comprised of foamed PVC or foamed PET.

Always according to the invention, said fourth layer can be comprised of metallic material, preferably of aluminum or stainless steel, carbon fiber or fiberglass.

Further according to the invention, said fourth layer can be comprised of stainless steel 470LP+24 Cr.

Particularly according to the invention, said fourth layer has a PREN index Min 23.8 (Max 25.3), Young module 190-220 (10^3 MPa), preferably 205 (10^3 MPa) and a hardness of 78 (ASTM A 370-05).

Still according to the invention, said reinforcement system can be fixed to the wall by mechanical coupling means.

Always according to the invention, total thickness of said reinforcement system and of said first layer can be between 1 and 5 cm, preferably 1.5 cm.

Preferably, according to the invention, said fourth layer, when comprised of metallic material, is subjected to sandblasting.

Finally according to the invention, said ventilated wall can comprise a further plate of fiberglass mat, placed between said fourth layer and said third layer.

The present invention will be now described, for illustrative, but not limitative purposes, according to its preferred embodiments, with particular reference to the following examples and to the figures of the enclosed drawings, wherein.

Figure 2:
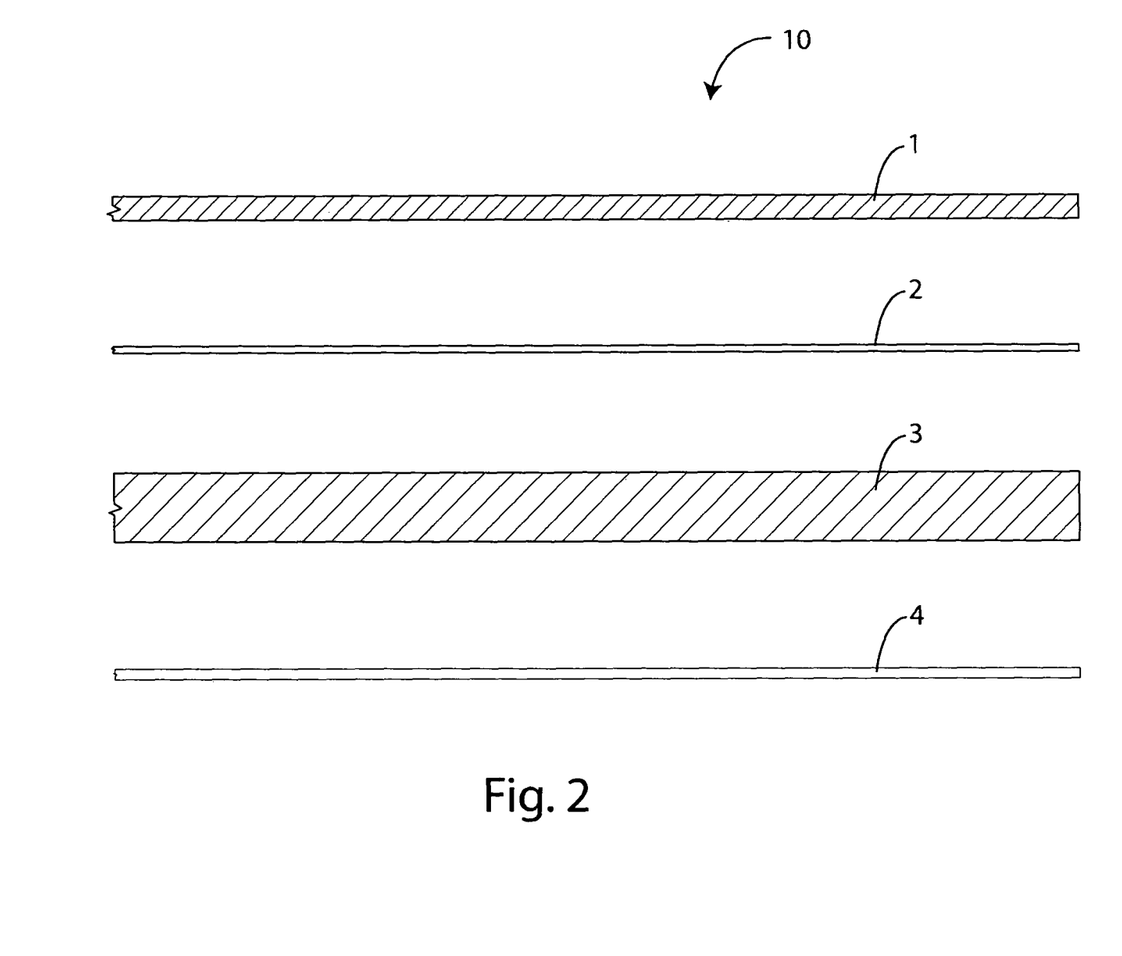
FIG. 2 is a section exploded view of an embodiment of a reinforcement system comprising a porcelain or ceramic stoneware plate according to the invention.
Figure 3:
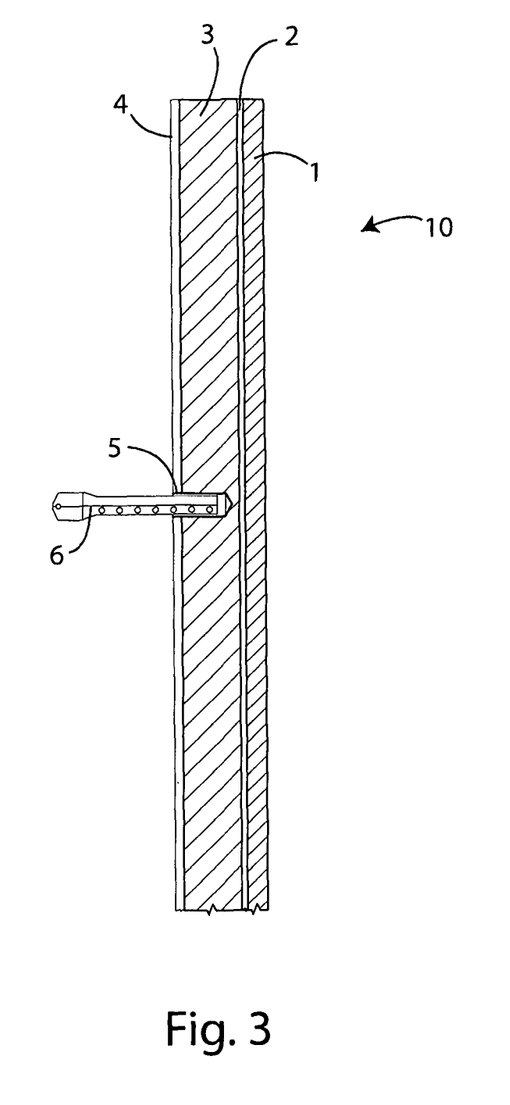
FIG. 3 is a vertical section of the system of FIG. 2.

Observing now FIGS. 2 and 3 of the enclosed drawings, it is observed an embodiment of a reinforcement system, according to the invention, comprising a first coating thin plate 1 for building ventilated walls, preferably porcelain or ceramic stoneware, of marble, of travertine or of volcanic stone or cement compounds, generically indicated by reference number 10, providing, on side faced toward said building (not shown), on which said ventilated wall is mounted, a second fiberglass layer or plate 2, coupled with said first layer 1, a third layer or plate 3, or light structural foamed material, preferably foamed PVC or foamed PET or other similar materials, and a fourth layer or plate 4, having a very thin thickness, comprised of metallic sheet, aluminum or stainless steel, of carbon fiber or fiberglass. In case fourth layer 4 is comprised of fiberglass, it will have a thickness higher than 2 mm.

Said plates or layers 1, 2, 3 or 4 are coupled each other by gluing material, particularly special resins. Particularly, said gluing material has the following mechanical features: 75-85 Shore D1/D15 hardness (ISO 868: 2003), preferably 80 Shore D1/D15 hardness (ISO 868: 2003); tensile strength 19-21 MPa, preferably 20 MPa (ISO 527: 1993), elongation at break 28-32%, preferably 30% (ISO 527:1993).

Particularly, epoxy resins are employed, mixed with polisulfuric polymers in a percentage included between 30% and 45%, conferring a higher corrosion resistance against chemical attacks, such as fuel and every kind of solvent. Said epoxy resin is thixotropic, to prevent that, while it is applied on different layers, outflows from edge zone, thus leaving the latter without resin.

Further, said resin according to the invention comprises elastomeric elements mixed between 7% and 15%, in order to make the resin flexible. Said elastomeric elements give elasticity and thus the same expansion to the assembled components.

Polyurethane resins are an alternative to the epoxy resins. Further, said type of polyurethane resin has a higher fluidity (viscosity at 25° C. corresponding to 3 mPas according to BROOKFIELD LVT for polyol and isocyanate mixture) than available resins, permitting easily spreading the same on layers and at the same time ensuring an optimum resistance against outer agents, for a better duration of the gluing time.

Said gluing materials have been developed in view of their behavior under flexure, so that they can participate to performances required when installing the wall and at the same time ensuring anchoring strength.

Obtained panel has a cohesive failure of about 6 kN/m under rotating drum peeling test (ISO 4578 Floating roller peel resistance).

Particularly, in case said fourth plate 4 is comprised of metallic material, it is subjected to sanding so as to improve fixing to the gluing material to promote a better coupling with the third plate 3.

Said fourth plate 4 is preferably comprised of stainless steel 470 LI+24 Cr, with a PREN Min 23.8 (Max 25.3), Young module 190-220 ($10^3$ MpA), preferably 205 ($10^3$ MpA) and a hardness of 78 (ASTM A 370-05).

If for example we imagine installing four ventilated walls according to known technique of 3000 mm×1000 mm, and if operator faces the situation in which an irregularity of planarity exists with respect to building anchoring frame, he/she would face great difficulties since failure of said thin plate would occur. This is overcome by the reinforcement system 10 according to the invention that, although bulky, as in the previous example, still can withstand to flexure pressures and at the same time can be easily fixed to the building anchoring frame.

Reinforcement system 10 shown and described has a thickness ranging between 1 cm and 5 cm.

As it can be observed from FIG. 3, reinforcement system 10 is mechanically fixed to a sub-structure (not shown) for anchoring the same to the building, by suitable slots 5, obtained in said fourth plate 4, preferably comprised of aluminum, through which fixing pins or devices 6 are inserted for fixing to said sub-structure.

In further embodiments, not shown, fixing devices can be hooking grips provided with rivets or other known devices.

By the solution according to the invention, a remarkably lower cost with respect to the prior are obtained. Further, reinforcement system 10 according to the invention reduces risk of damaging of the first thin plate 1, since fixing devices 6 are only coupled to the fourth 4 and third 3 plates, thus ensuring a reinforcement system 10 and at the same time preserving first coating plate 1, i.e. the most delicate plate. Devices 6 for suspension and fixing to sub-structure are sized so that and empty space exists between reinforcement system 10 according to the invention and building outer wall, an air space communicating outside by aeration ports, usually provided at the bottom and at the top of the wall.

A ventilation effect or "chimney effect" is naturally created within said space, due to temperature difference between air within ventilation chamber and outdoor air.

Outdoor air enters within air space from below upward thus realizing positive flow increasing transpiration properties of the wall. Thanks to the above ventilation, water vapor arriving from inside is quickly eliminated, condensation is eliminated, negative effects of possible water leaking are drastically reduced, and an effective reduction of heat amount entering or exiting from the building is promoted.

The use of the first plate 1, preferably comprised of stoneware (Gammastone® Stoneware), with interposition of a core or third plate or layer 3, comprised of foamed material, preferably foamed PVC or foamed PET, between said first plate 1 and said fourth plate 4, ensures remarkable advantages with as far as energy saving is concerned.

Test have demonstrated that, in winter time, a ventilated wall according to the invention cools in a longer period than a coating comprised only of stoneware; moreover, in summer, a positive behavior is obtained since presence of a foamed material core 3, such as foamed PVC or PET, realizes a protection against sun irradiation, thus saving energy.

Further, an acoustic insulation is obtained by the solution according to the present invention, thus dramatically reducing noise pollution within the building.

Advantages are further obtained with respect to the protection against agent corrosion of outside building wall by weathering.

In fact, solution according to the invention permits obtaining a full permeability.

Tests carried out have demonstrated that humidity from inside is ejected outside without any difficulty, so that walls are always dry, thus avoiding problems of separation for building walls. Further tests have demonstrated that inventive solution, e.g. by a first stoneware plate 1 (300 cm×100 cm), a core or third plate 3 comprised of foamed material, such as foamed PVC or PET, mechanically or chemically glued to a fourth aluminum plate 4, completely prevent risk of failure of first thin plate 1, since foamed material core 3 permits absorbing every kind of shocks and vibrations.

Another advantage obtained by reinforcement system 10 according to the invention is ease of cleaning that can be carried out by every cleaning system providing brushes and pressure water and like.

Even resistance against wind is fully ensured by reinforcement system 10 according to the invention, resisting to values fifteen times higher than stresses caused by a hurricane.

Features of the reinforcement system 10 according to the invention are further aimed at positively solving installation procedure, since fourth plate 4, comprised of aluminum or of another similar material, such as stainless steel, carbon fiber or fiberglass, permits realizing slots 5 for fixing to a substructure, or to use other known fixing systems.

By the solution according to the invention, handling of plates while mounting the system is really easy, since it will be possible using every type of motion means (e.g. yard cranes, pliers, suckers or cords), without any failure risk.

Figure 4A:
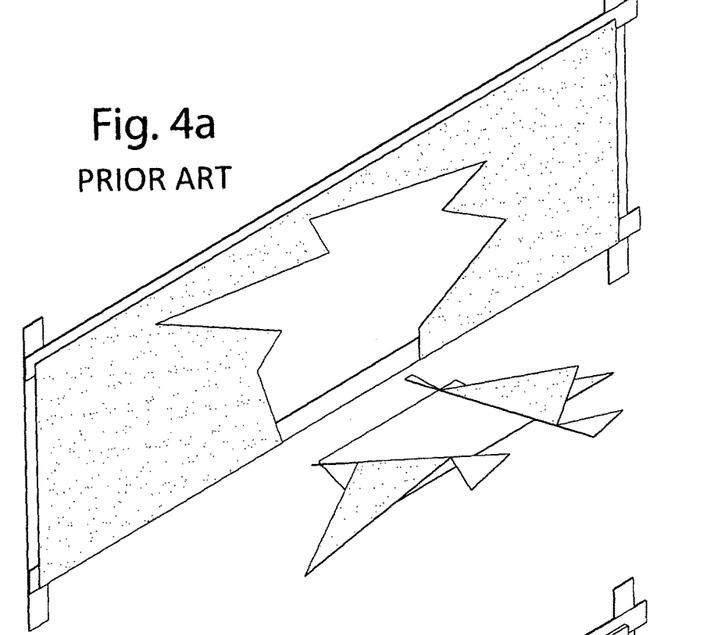
FIGS. 4a and 4b are respectively perspective views of the known solution and of the inventive solution in case of shock breaking.
Figure 4B:
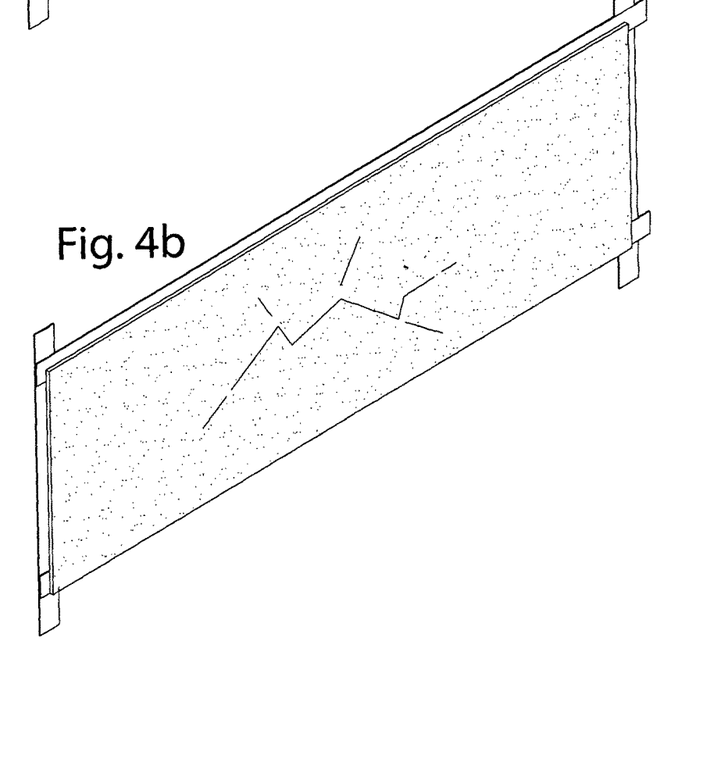

By reinforcement system 10 according to the invention, it is further prevented risk of fall of fragments in case of failure of first plate 1, comprised of porcelain stoneware or like, thanks to the provision of the second fiberglass plate 2, glued on core or third layer 3 comprised of foamed material, particularly, foamed PVC or PET, and thus on fourth plate 4, thus obtaining a structural body ensuring complete absence of fall of fragments in case of failure. FIGS. 4a and 4b show behavior of known reinforcement system (FIG. 4a) with respect to reinforcement system according to the invention (FIG. 4b).

Laboratory tests have demonstrated that each collision, event a violent collision, causes the simple impression of stoneware of collision zone, unlike what occurs in known structures.

Further, presence of second fiberglass plate 2 and of fourth plate 4, preferably comprised of metallic material, make reinforcement system 10 according to the invention flexible according to both possible flexion direction, i.e. inside and outside.

Figure 5:
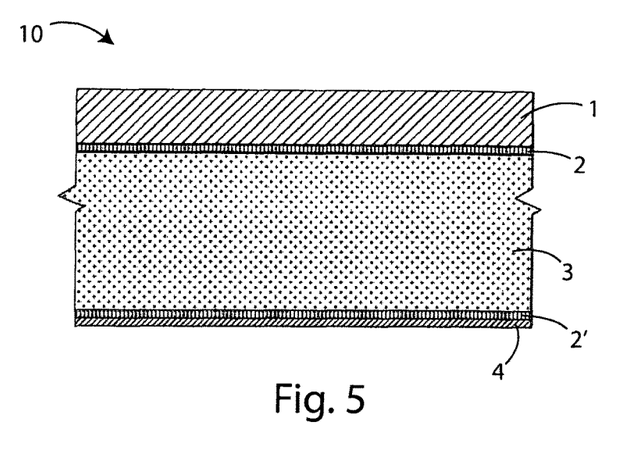
FIG. 5 is a vertical section view of a further embodiment of the reinforcement system according to the invention.

In a further embodiment shown in FIG. 5, said reinforcement system 10 provides a further layer 2' comprised of fiberglass mat, between fourth metallic material plate or layer 4 and third plate or layer 3, comprised of foamed material. preferably, first layer 1 is comprised of porcelain stoneware, with a thickness of 3 mm, second layer 2 is comprised of fiberglass mat with a thickness of 0.5 mm, third layer 3 is comprised of structural foamed material with a thickness of 10 mm, said further second layer 2 is always comprised of fiberglass mat with a thickness of 0.5 mm and fourth layer 4 is comprised of aluminum and has a thickness of 0.5 mm.

Said fiberglass mat layer 2 permits conferring a higher resistance to the coupling, particularly when porcelain stoneware is employed for first layer 1, being it a rather fragile material.

Physical features of the reinforcement system according to the invention will be described in the following, making reference to the enclosed examples.

EXAMPLE 1. CHARACTERIZATION OF REINFORCEMENT SYSTEM

Water Absorption

Sample of reinforcement system according to the invention subjected to test has standard sizes 200 mm×200 mm, with a thickness of 15 mm, and is realized by overlapping a first layer 1 comprised of porcelain stoneware with a thickness of 3 mm, a second layer 2 comprised of fiberglass mat, a third structural foamed core layer 3; a further second fiberglass mat layer 2' and a fourth stainless steel layer 4 with a thickness of 0.5 mm Sample is subjected to a test carried out according to UNI EN ISO 10545-3 2000 provisions dated Jun. 30, 2000 (Ceramic tiles—determination of water absorption, of apparent porosity, of apparent relative density and of apparent density".

Dried sample has been impregnated with water and water absorption has been calculated by ratio between dry mass and wet mass employing boiling method.

Tests results are shown in the following:

Boiling Method

| Sample [n.] | Dimensions [mm] | Height [mm] | Dry Mass $M_1$ [g] | Wet Mass $M_{2b}$ [g] | Water absorption $E_b$ [%] |
|---|---|---|---|---|---|
| 1 | 200.1 × 200.2 | 14.9 | 616.1 | 622.2 | 0.99 |
| 2 | 200.1 × 201.0 | 15.0 | 632.7 | 638.0 | 0.84 |
| 3 | 200.3 × 200.7 | 14.8 | 628.9 | 637.5 | 1.37 |
| 4 | 201.4 × 200.9 | 14.8 | 628.7 | 633.2 | 0.72 |
| 5 | 200.9 × 200.3 | 14.6 | 610.1 | 614.5 | 0.72 |
| Average $E_b$ | | | | | 0.93 |

EXAMPLE 2. CHARACTERIZATION OF REINFORCEMENT SYSTEM

Aging

Sample of reinforcement system according to the invention subjected to test is comprised of 4 tubes, nominal dimensions 340 mm×100 mm×15 mm, realized by overlapping a first layer 1 comprised of porcelain stoneware with a thickness of 3 mm, a second layer 2 comprised of fiberglass mat, a third structural foamed core layer 3; a further second fiberglass mat layer 2' and a fourth stainless steel layer 4 with a thickness of 0.5 mm.

Sample is subjected to a test carried out according to UNI EN ISO 9142:2004 provisions dated Nov. 1, 2004 &Adhesives—Guide to selection of normalized laboratory for aging tests of gluing joints", cycle D4. A thermo-wt-static chamber has been employed for said test (identification code FT 137).

Sample was subjected to a conditioning lasting 20 cycles (D.4 UNI EN ISO 9142), each one as indicated in the following:

exposure for 5 h and 20 min at +70° C. and 95% of relative humidity;

exposure for 5 h and 20 min at −40° C.

No defect has been visibly detected after the cyclic test.

EXAMPLE 3. CHARACTERIZATION OF REINFORCEMENT SYSTEM

Compressive Strength

Sample of reinforcement system according to the invention subjected to test by overlap of: a first layer 1 comprised of porcelain stoneware with a thickness of 3 mm, a second layer 2 comprised of fiberglass mat with a nominal thickness of 0.5 mm, a third structural foamed core layer 3, with a density of 300 g/m², a further second fiberglass mat layer 2', with a nominal thickness of 0.5 mm, and a fourth stainless steel layer 4 with a thickness of 0.5 mm. Sample was subjected to a test carried out according to UNI EN ISO 826:2013 provisions dated Apr. 4, 2013 "Thermal insulating elements for buildings—determination of compressive behavior".

5 tubes have been obtained from sample under test, each one having dimensions of 100 mm×100 mm, and the original thickness.

In order to carry out the test, the following apparatus was employed:
- universal press model "IG 10000" from Istituto Giordano S.p.A. (apparatus identification code: FT161)
- movement linear transducer from Mitutoyo;
- sample load cell, full scale 25 kN (apparatus identification code: FT 490);
- centesimal digital caliper 200 mm (apparatus identification code: EDI066), with a calibration report issued by Istituto Giordano S.p.A.

Every tube was placed between two ground aluminum plates, beforehand subjected to a load with 250±10 Pa. compression rate of movable plate has been calculated according to paragraph 7.2 of UNI EN 826:2013 provision, and was 1.5 mm/min.

When test was terminated, it has been calculated:
compressive strength "$\sigma_m$", indicated as kPa, according to paragraph 8.1.1 e 8.2 of UNI 826:2013 provision, according to formula:

$$\sigma_m = 10^3 \cdot \frac{F_m}{A_0}$$

wherein $F_m$=acquired force at 10% compression of thickness of maximum force recorded at material failure, indicated as N;
$A_0$=initial area of tube cross-section, indicated as mm²
relative deformation "$\varepsilon_m$", indicated as percentage, according to paragraph 8.1.2 of UNI En 826:2013 provision, according to formula:

$$\varepsilon_m = \frac{X_m}{d_0} \cdot 100$$

wherein $X_m$=displacement corresponding to maximum force obtained, indicated as mm;
$d_0$=tube initial thickness measured, indicated as mm. Environmental conditions when carrying out the test was the following: room temperature 23±1° C. e relative humidity 50±5%.

Test Results

| Tube [n.] | Compressive force "$F_m$"* [N] | Thickness [mm] | Deformation [mm] | Relative deformation "$\varepsilon_m$" [%] | Strength area "A" [mm²] | Compressive strength "$\sigma_m$" [kPa] |
|---|---|---|---|---|---|---|
| 1 | 14137 | 15.45 | 0.58 | 3.8 | 9565 | 1478 |
| 2 | 13636 | 15.54 | 0.74 | 4.8 | 10039 | 1358 |
| 3 | 11419 | 15.52 | 0.42 | 2.7 | 9998 | 1142 |
| 4 | 13519 | 14.94 | 0.66 | 4.4 | 9804 | 1379 |
| 5 | 15057 | 15.39 | 0.56 | 3.6 | 9850 | 1529 |
| Average | 13554 | 15.37 | 0.59 | 3.9 | 9851 | 1377 |

(*) maximum compressive force is obtained with a deformation <10%.

Figure 6:
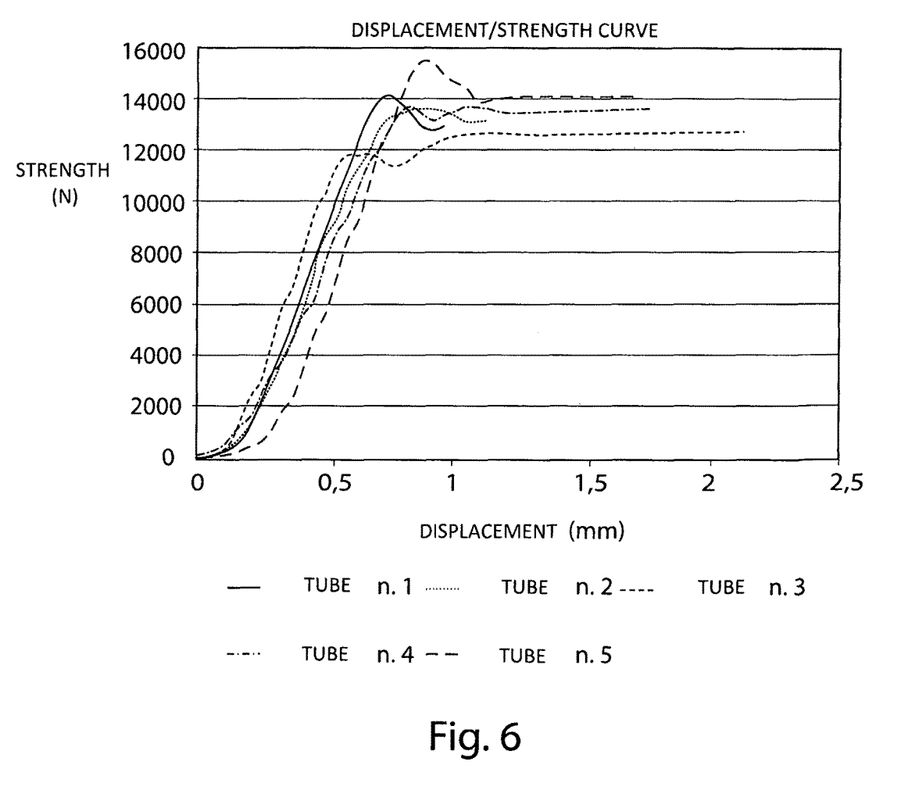
FIG. 6 is a graph of behavior of sample of the reinforcement system according to the invention of example 3.

Reference will be made to the graph of tubes relevant to force/displacement curves of FIG. 6.

EXAMPLE 4. CHARACTERIZATION OF REINFORCEMENT SYSTEM

Flexure Strength

Sample of reinforcement system according to the invention subjected to test with a nominal thickness of 15 mm, realized by overlap of: a first layer 1 comprised of porcelain stoneware with a thickness of 3 mm, a second layer 2 comprised of fiberglass mat with a nominal thickness of 0.5 mm, a third structural foamed core layer 3, with a density of 300 g/m²; a further second fiberglass mat layer 2', with a nominal thickness of 0.5 mm, and a fourth stainless steel layer 4 with a thickness of 0.5 mm.

Sample was subjected to a test carried out according to UNI EN ISO 12089:2013 provisions dated Apr. 11, 2013 "Thermal insulating elements for buildings—determination of flexure behavior".

5 tubes have been obtained from sample under test, each one having dimensions of 1300 mm×100 mm, and the original thickness, fulfilling specifications of paragraph 6.1.1 "Method A" of UNI EN 12089:2013 provision.

In order to carry out the test, the following apparatus was employed:
- electronic dynamometer model "IG 10000" from Istituto Giordano S.p.A. (apparatus identification code: FT161)
- sample load cell "TCS/HA" available from AEP, full scale 500 N (apparatus identification code: FT 233);
- centesimal digital caliper available from Borletti (apparatus identification code: EDI066);
- digital meter available from Mitutoyo, full scale 5500 mm (apparatus identification code: FT364);
- adjustable cylindrical supports, parallel each other and along the same horizontal plane with a diameter of 30 mm, having a push knife with the same shape and sizes of supports.

Tubes have been symmetrically placed on supports, so that load direction is perpendicular with respect to the longitudinal axis of the tube. Forces and lowering arrows have been continuously recorded.

Flexure strength "$_b$" according to paragraph 8.2 of UNI EN 12089:2013 was calculated, using the following formula:

$$\sigma_b = 3 \cdot 10^8 \cdot \frac{F_m \cdot L}{2 \cdot b \cdot d^2}$$

wherein $\sigma_b$=flexure resistance parameter, indicated as kPa;
$F_m$=maximum applied force, indicated as N;
L=distance between supports, indicated as mm;
b=tube width, indicated as mm;
d=tube thickness, indicated as mm.

Environmental conditions when carrying out test were the following: room temperature 23±1° C. and relative humidity 50±5%—

Test Results

| Tube [n.] | Thickness "b" [mm] | Maximum force applied "$F_m$" [N] | Movement at maximum force "$X_m$" [mm] | Flexure strength "$\sigma_b$" [kPa] |
|---|---|---|---|---|
| 1 | 15.71 | 1238 | 14.8 | 1576 |
| 2 | 16.20 | 1240 | 15.4 | 1530 |
| 3 | 16.19 | 1087 | 12.3 | 1343 |
| Average | 16.03 | 1188 | 14.1 | 1483 |

Figure 7:
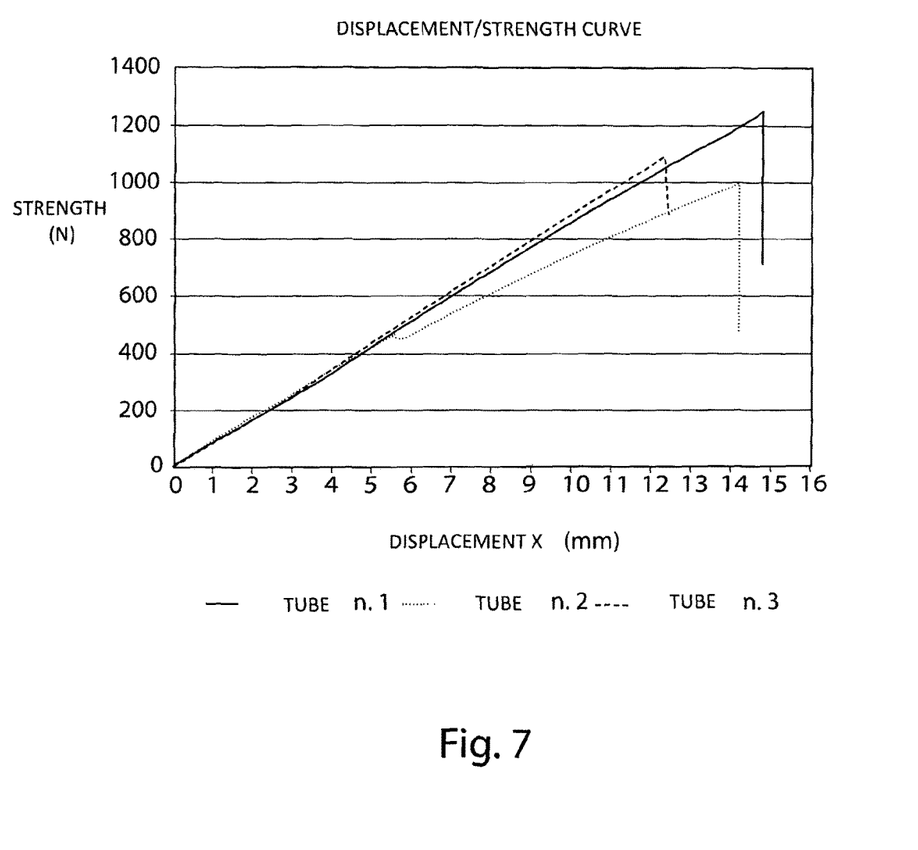
FIG. 7 is a graph of behavior of sample of the reinforcement system according to the invention of example 4.

Reference is made to the tube run relevant to force/movement curves of FIG. 7.

EXAMPLE 5. CHARACTERIZATION OF REINFORCEMENT SYSTEM

Resistance to Thermal Shock

Sample of reinforcement system according to the invention subjected to test has nominal dimensions of 200 mm×200 mm and a total nominal thickness of 15 mm, realized by overlap of: a first layer 1 comprised of porcelain stoneware with a thickness of 3 mm, a second layer 2 comprised of fiberglass mat, a third structural foamed core layer 3, with a density of 300 g/m²; a further second fiberglass mat layer 2', and a fourth stainless steel layer 4 with a thickness of 0.5 mm. Sample was subjected to a test carried out according to UNI EN ISO 10545:9_2000 provisions dated Jun. 30, 2000 "Ceramic tiles—determination of resistance to thermal shock".

Sample has been first vertically submerged into cold water at temperature of 15° C.; after 15 minutes at low temperature, it has been placed within oven at a temperature of 145° C. for at least 20 minutes. Said process was repeated 10 times, and then sample was examined in order to identify possible defects visible to the naked eye.

Test Results

| Tube [n.] | Dimensions [mm] | Height [mm] | Water absorption $E_b$ [%] | Visible defects |
|---|---|---|---|---|
| 1 | 200.3 × 200.1 | 14.8 | 0.99 | None |
| 2 | 200.4 × 200.4 | 15.0 | 0.84 | None |
| 3 | 201.1 × 201.0 | 14.7 | 0.87 | None |
| 4 | 201.4 × 200.9 | 14.4 | 0.72 | None |
| 5 | 201.7 × 199.8 | 14.5 | 0.72 | None |

EXAMPLE 6. CHARACTERIZATION OF REINFORCEMENT SYSTEM

Resistance to Detachment

Sample of reinforcement system according to the invention subjected to test is comprised of 2 tubes nominal dimensions of 100 mm×100 mm and a total nominal thickness of 15 mm, realized by overlap of: a first layer 1 comprised of porcelain stoneware with a thickness of 3 mm, a second layer 2 comprised of fiberglass mat, a third structural foamed core layer 3, with a density of 300 g/m²; a further second fiberglass mat layer 2', and a fourth stainless steel layer 4 with a thickness of 0.5 mm.

Test was carried out according to standard set by Istituto Giordano S.p.A.

A circular crown impression has been carried out on all tubes subjected to test, with a nominal diameter of 39 mm, until reaching the support in order to release the coating layer, all along its thickness, testing cooperation effect of the surrounding zone (ceramic side). Metallic cylinders with a nominal diameter of about 36 mm has been applied on surface individuated in this way for each tube, by a epoxy resin bi-component adhesive.

The following apparatus was employed to carry out the test:
dynamometer with a 10000 N load call (identification codes TDL016 and TDL029);
centesimal digital caliper (identification code LG023).

After mechanical working and gluing of grips, tubes was placed in a climatic room, under conditions of temperature of (20±2)° C. and relative humidity (50±5)%, for at least 24 hours. Then, traction tests have been carried out, fixing machine hooking system to small cylinders and applying a uniform traction stress, until obtaining detachment of the tube, thus employing a test rate of 5 mm/min.

Detachment resistance values of the outer layer "S" indicate as N/mm², was obtained applying the following formula:

$$SS = \frac{F}{A}$$

wherein: F=maximum force applied, indicated as N; A=surface area subjected to test, indicated as mm². Environmental conditions when carrying out the test was the following: room temperature 24±5° C. and relative humidity 65±10%.

Test Results.

| Tube [n.] | Load [N] | Adhesion [N/mm²] | Failure mode |
|---|---|---|---|
| 1 | 1632.00 | 4.29 | Detachment of coating from the support |
| 2 | 939.00 | 2.47 | Detachment of coating from the support |
| Average | 1285.50 | 3.38 | / |

EXAMPLE 7. CHARACTERIZATION OF REINFORCEMENT SYSTEM

Determination of corrosion resistance under salt spray according of UNI EN ISO 9227_2012 provision Sample of reinforcement system according to the invention subjected to test is comprised of a panel having dimensions 200 mm×200 mm and a thickness of 15 mm, realized by overlap of: a first layer 1 comprised of porcelain stoneware with a thickness of 3 mm, a second layer 2 comprised of fiberglass mat, a third structural foamed core layer 3; a further second fiberglass mat layer 2', and a fourth stainless steel layer 4 with a thickness of 0.5 mm.

Sample was subjected to a test carried out according to UNI EN ISO 9227:2012 provisions dated Dec. 12, 2012 "Corrosion tests under artificial atmosphere—salt spray test".

A salt spray chamber for accelerated corrosion tests model "CORROTHERM 610E" available from Erichsen Instruments (identification code CHG072) has been used to carry out the test.

Sample has been subjected to salt spray chamber under the following conditions:
- test solution: sodium chloride (according to paragraph 3.1 of UNI ISO 9227:2012 provision) dissolved into 5% deionized water;
- temperature within test chamber: 35±2° C.;
- continuous exposition;
- total exposition time: 24 hours;
- head surface inclination angle: 45° (or as installed)— after the exposition time expired, sample was withdrawn from test chamber, washed by deionized water and dried by compressed air.

Then, condition of surfaces of composite panel was evaluated.

After 24 hours of exposition within a neutral salt spray chamber, neither morphological or dimension deterioration was observed. Sample was completely intact.

EXAMPLE 8. CHARACTERIZATION OF REINFORCEMENT SYSTEM

Determination of static load strength, with a load evenly distributed (negative pressure) for simulation of wind load on wall coating according to according to paragraph 5.4.1 of ETAG 034-1:2012

Sample of reinforcement system according to the invention subjected to test is comprised of a coating portion of a ventilated wall with a hidden hook comprised of a support structure made up of aluminum section bars and extruded brackets, outer panel coating having dimensions 3000 mm×1000 mm and a thickness of 15 mm, realized by overlap of: a first layer 1 comprised of porcelain stoneware with a thickness of 3 mm, a second layer 2 comprised of fiberglass mat, a third structural foamed core layer 3 comprised of 300 g/m² foamed PVC; a further second fiberglass mat layer 2', and a fourth stainless steel layer 4 with a thickness of 0.5 mm.

Structure, comprised of section bars and brackets, all obtained by extrusion of aluminum alloy 6063 T6, is comprised of:
- raw brackets with a "L" section, fixed by screws to the steel frame;
- raw "T" shaped section bars (vertical uprights), fixed to brackets by rivets (wide head, steel/aluminum) with a "fixed point" and "sliding point" mode;
- slotted horizontal elements, fixed to the vertical uprights by rivets (wide head, steel/aluminum) and shaped so that stresses due to the wind action are axial with respect to braces;
- aluminum fixing braces fixed to the panel stainless steel by rivets (wide head, steel/aluminum).

Thus assembled plates are laid on slotted horizontal elements. The system, by millimeter adjustment screws, provides possibility of obtaining variable run. Plates will be prevented to lateral sliding by removable block.

Test was carried out according to provisions of ETAG 054-1-2012 dated April 2012 "Guideline for European technical approval of kits for external wall claddings—Part I: Ventilated cladding kits comprising cladding components and associated fixings".

A semiautomatic computerized control and measurement system was used for carrying out the test that can carry out negative pressure test and provided with 6 cylindrical body rectilinear position transducers to measure deformations, GEFRAN 8 identification code of apparatus: EDI017a, EDI017b, EDI017c, EDI017d, EDI017e e EDI017f).

Environmental conditions during test was: room temperature (24±1)° C. and relative humidity (52±5)%. Sample was mounted on test bench and is subjected to negative pressure wind load resistance test by measuring deformation under load and detection of residual deformation according to paragraph 5.4.1 "Wind load resistance" of ETAG 034-1 provision—

Particularly, the following test procedure has been carried out:
- degree of settlement at 300 Pa during which recordals are carried out;
- settlement step at 300 Pa, when no recordal is made and reset of sensors after load removal;
- step at 500 Pa;
- step at 1000 Pa;
- subsequent steps every 200 Pa until failure of the sample or maximum limit of test apparatus.

After settlement phases, deformation under load after at least 10 s of stability was recorded for each pressure step, and then, after resetting pressure, residual deformation was recorded after at least 60 seconds.

Results of the test with respect to static load resistance evenly distributed under negative pressure are shown.

| Negative Pressure [Pa] | Measurement point deformation | | | | | |
|---|---|---|---|---|---|---|
| | a [mm] | b [mm] | c [mm] | d [mm] | e [mm] | f [mm] |
| 0 | 0.00 | 0.00 | 0.00 | 0.00 | 0.00 | 0.00 |
| −502.9 | −0.33 | −0.64 | −0.34 | −0.49 | −0.59 | −0.31 |
| 0.1 | −0.05 | −0.05 | −0.05 | −0.02 | −0.02 | −0.02 |
| −1011.0 | −0.71 | −1.34 | −0.74 | −0.96 | −1.21 | −0.82 |
| 0.1 | −0.05 | −0.07 | −0.05 | −0.02 | −0.05 | −0.02 |
| −1206.2 | −0.89 | −1.69 | −0.93 | −1.14 | −1.50 | −1.06 |
| 0.2 | −0.09 | −0.09 | −0.10 | −0.08 | −0.12 | −0.09 |
| −1404.6 | −1.08 | −2.07 | −1.13 | −1.35 | −1.84 | −1.46 |
| 0.3 | −0.10 | −0.10 | −0.10 | −0.09 | −0.09 | −0.09 |
| −1614.3 | −1.29 | −2.55 | −1.34 | −1.55 | −2.20 | −1.76 |
| 0.1 | −0.20 | −0.22 | −0.25 | −0.25 | −0.29 | −0.22 |
| −1802.8 | −1.47 | −2.97 | −1.52 | −1.72 | −2.53 | −2.02 |
| 0.3 | −0.37 | −0.38 | −0.39 | −0.25 | −0.20 | −0.23 |
| −2010.9 | −1.71 | −3.47 | −1.77 | −1.90 | −2.90 | −229 |
| 0.2 | −0.39 | −0.40 | −0.42 | −0.25 | −0.22 | −0.23 |
| −2212.4 | −2.00 | −4.03 | −2.01 | −2.09 | −3.331 | −2.61 |
| 0.1 | −0.42 | −0.45 | −0.44 | −0.28 | −0.30 | −0.29 |
| −2423.0 | −2.24 | −4.58 | −2.24 | −2.30 | −3.70 | −3.00 |
| 0.0 | −0.39 | −0.41 | −0.45 | −0.50 | −0.40 | −0.53 |
| −2642.7 | −2.53 | −5.15 | −2.52 | −2.48 | −4.11 | −3.32 |
| 0.2 | −0.40 | −0.42 | −0.46 | −0.49 | −0.48 | −0.50 |
| −2824.6 | −2.81 | −5.72 | −2.80 | −2.61 | −4.45 | −3.53 |
| 0.2 | −0.39 | −0.41 | −0.45 | −0.50 | −0.46 | −0.44 |
| −3049.1 | −3.10 | −6.35 | −3.11 | −2.73 | −4.82 | −3.74 |
| 0.1 | −0.44 | −0.45 | −0.44 | −0.48 | −0.50 | −0.50 |
| −3223.2 | −3.37 | −6.90 | −3.37 | −2.96 | −5.16 | −3.96 |

-continued

| Negative Pressure [Pa] | a [mm] | b [mm] | c [mm] | d [mm] | e [mm] | f [mm] |
|---|---|---|---|---|---|---|
| 0.1 | −0.42 | −0.44 | −0.51 | −0.46 | −0.52 | −0.52 |
| −3213.2 | −3.50 | −7.15 | −3.38 | −2.97 | −5.08 | −3.92 |
| 0.0 | −0.45 | −0.50 | −0.52 | −0.49 | −0.52 | −0.50 |
| −3413.5 | −3.80 | −7.80 | −3.69 | −3.13 | −5.53 | −4.20 |
| 0.3 | −0.51 | −0.55 | −0.52 | −0.50 | −0.54 | −0.51 |
| −3650.3 | −4.31 | −8.83 | −4.22 | −3.47 | −6.38 | −4.68 |
| 0.4 | −0.55 | −0.57 | −0.56 | −0.50 | −0.55 | −0.49 |
| −3846.3 | −4.56 | −9.35 | −4.49 | −3.68 | −6.77 | −4.96 |
| 0.1 | −0.60 | −0.65 | −0.59 | −0.50 | −0.40 | −0.53 |
| −4091.6 | −4.82 | −10.22 | −4.88 | −4.08 | −7.51 | −5.40 |
| 0.2 | −0.62 | −0.65 | −0.60 | −0.52 | −0.55 | −0.53 |
| −4324.6 | −5.32 | −11.01 | −5.21 | −4.34 | −8.17 | −5.82 |
| 0.0 | −0.65 | −0.65 | −0.60 | −0.60 | −0.65 | −0.60 |
| −4537.9 | −5.73 | −12.04 | −5.76 | −4.77 | −8.90 | −6.55 |
| 0.2 | −0.68 | −0.66 | −0.64 | −0.65 | −0.68 | −0.66 |
| −4610.3 | Sample failure | | | | | |

On the basis of the negative pressure test carried out, and on the basis of the ETAG 034-1 guide, sample under examination gives the following results: first failure load equivalent to 4610 Pa and failure load equivalent to 4538 Pa.

Present invention has been described, for illustrative, but not limitative, purposes, according to its preferred embodiments, but it is to be understood that variation and/or modifications can be introduced by those skilled in the art without departing from the scope as defined in the enclosed claims.

The invention claimed is:

1. A ventilated wall for buildings, the ventilated wall attached to a building at a distance spaced from the building to realize an interspace for air circulation, the ventilated wall comprising:
   a first layer comprised of porcelain or ceramic stoneware, of marble, of travertine or of volcanic stone or of cement compounds, the first layer having a side faced toward said building and a side faced away from said building; and
   a reinforcement system coupled to the first layer on the side faced toward said building, the reinforcement system comprising:
     a second layer comprising fiberglass,
     a third layer comprised of foamed material, and
     a fourth layer,
   wherein coupling of each of said first, second, third, and fourth layers being realized by a gluing material having flexibility properties wherein:
   said gluing material is a resin;
   said resin is an epoxy resin or a polyurethane resin; and
   said resin comprises a mixture comprising polymeric precursors and elastomeric agents, the elastomeric agents having a concentration between 7% and 15% in weight of a total weight of the mixture.

2. The ventilated wall according to claim 1, characterized in that said gluing material has mechanical features comprising:
   a hardness ranging 75-85 Shore D1/D15 (ISO 868: 2003);
   a tensile strength ranging 19-21 MPa; and
   an elongation at break ranging 28-32%.

3. The ventilated wall according to claim 1, wherein the mixture further comprises thixotropic agents.

4. The ventilated wall according claim 1, wherein the mixture further comprises poli-sulfuric polymers in a weight percentage between 30% and 45% in weight of the total weight of the mixture.

5. The ventilated wall according to claim 1, wherein the mixture has a viscosity of about 3 mPas at 25° C.

6. The ventilated wall according to claim 1, characterized in that said third layer is comprised of foamed PVC or foamed PET.

7. The ventilated wall according to claim 1, characterized in that said fourth layer is comprised of metallic material, carbon fiber, or fiberglass.

8. The ventilated wall according to claim 1, characterized in that said fourth layer is comprised of stainless steel 470LP+24 Cr.

9. The ventilated wall according to claim 1, wherein mechanical features of said fourth layer comprise:
   a PREN index ranging from 23.8 to 25.3,
   Young modulus ranging 190-220 ($10^3$ MPa), and
   a hardness of 78 (ASTM A 370-05).

10. The ventilated wall according to claim 1, characterized in that said reinforcement system is fixed to the building by at least one mechanical coupler.

11. The ventilated wall according to claim 1, characterized in that total thickness of said reinforcement system and of said first layer is included between 1 cm and 5 cm.

12. The ventilated wall according to claim 1, characterized in that said fourth layer comprises a metallic material which was subjected to sandblasting.

13. The ventilated wall according to claim 1, characterized in that further comprises a further layer of fiberglass mat, placed between said fourth layer and said third layer.

14. The ventilated wall according to claim 2, wherein said hardness is 80 Shore D1/D15 hardness (ISO 868: 2003).

15. The ventilated wall according to claim 2, wherein said tensile strength is 20 MPa (ISO 527: 1993).

16. The ventilated wall according to claim 2, wherein said elongation at break is 30% (ISO 527:1993).

17. The ventilated wall according to claim 7, wherein said metallic material is aluminum or stainless steel.

18. The ventilated wall according to claim 1, wherein said fourth layer has a PREN index ranging from 23.8 to 25.3, Young modulus of about 205 ($10^3$ MPa), and a hardness of 78 (ASTM A 370-05).

19. The ventilated wall according to claim 11, wherein said total thickness of the reinforcement system and the first layer is 1.5 cm.

20. The ventilated wall according to claim 1, wherein the reinforcement system is mechanically coupled to the building by inserting at least one fixing device through at least one slot formed in the fourth layer of the reinforcement system.

* * * * *